(12) United States Patent
Wilhelm et al.

(10) Patent No.: US 11,930,788 B2
(45) Date of Patent: Mar. 19, 2024

(54) PET TOY

(71) Applicant: Doskocil Manufacturing Company, Inc., Arlington, TX (US)

(72) Inventors: Josiah Wilhelm, Fort Worth, TX (US); Ronald Bagley, Dallas, TX (US); Sunil Pinto, Arlington, TX (US)

(73) Assignee: PLUTO OPCO (CAYMAN), LLC, Grand Cayman (KY)

( * ) Notice: Subject to any disclaimer, the term of this patent is extended or adjusted under 35 U.S.C. 154(b) by 227 days.

(21) Appl. No.: 17/409,977

(22) Filed: Aug. 24, 2021

(65) Prior Publication Data
US 2022/0295745 A1 Sep. 22, 2022

Related U.S. Application Data

(60) Provisional application No. 63/164,193, filed on Mar. 22, 2021.

(51) Int. Cl.
*A01K 15/02* (2006.01)

(52) U.S. Cl.
CPC .................................. *A01K 15/025* (2013.01)

(58) Field of Classification Search
CPC .... A01K 15/025; A01K 15/026; A01K 15/02; A01K 31/06; A01K 39/00; A01K 5/015; A61J 17/02; A61J 11/0055; A63H 33/006; A63H 33/00
USPC .......................... 446/227; 119/477, 707, 702
See application file for complete search history.

(56) References Cited

U.S. PATENT DOCUMENTS

| | | | |
|---|---|---|---|
| 10,524,450 B1 * | 1/2020 | Dewey ................. | A01K 15/025 |
| 2013/0036988 A1 * | 2/2013 | Lai ....................... | A01K 15/026 |
| | | | 119/709 |
| 2014/0186276 A1 * | 7/2014 | Mahe ................... | A01K 15/026 |
| | | | 426/94 |

\* cited by examiner

*Primary Examiner* — Jeffrey R Larsen
(74) *Attorney, Agent, or Firm* — GLOBAL IP COUNSELORS, LLP

(57) ABSTRACT

A pet toy includes a first deformable member and a second deformable member. The first deformable member has a first receiving opening and a second receiving opening. The second deformable member has a first end that is received in the first receiving opening. The second deformable member has a second end that is received in the second receiving opening of the first deformable member. The second deformable member is more deformable than the first deformable member.

15 Claims, 6 Drawing Sheets

PET TOY

CROSS-REFERENCE TO RELATED APPLICATIONS

This application claims priority to Provisional U.S. Patent Application No. 63/164,193, filed on Mar. 22, 2021. The entire disclosure of Provisional U.S. Patent Application No. 63/164,193 is hereby incorporated herein by reference.

BACKGROUND

Field of the Invention

The present invention generally relates to a pet toy. More specifically, the present invention relates to a pet toy that can be tugged by a dog.

Background Information

Pet toys can be bumper toys, chew toys, or tug toys. A single pet toy can be designed to be all three. That is, the pet toys can be soft but durable to induce chewing on the pet toy. Pet toys can also be designed for ease of use, such as for easy storage and for travel.

SUMMARY

In view of the state of the known technology, it has been determined that an improved pet toy is desired. A first aspect of the present disclosure is to provide a pet toy comprising a first deformable member and a second deformable member. The first deformable member has a first receiving opening and a second receiving opening. The second deformable member has a first end that is received in the first receiving opening. The second deformable member has a second end that is received in the second receiving opening of the first deformable member. The second deformable member is more deformable than the first deformable member.

In a second aspect of the pet toy in accordance with the first aspect, the first deformable member is made of rubber.

In a third aspect of the pet toy in accordance with the second aspect, the second deformable member is a rope.

In a fourth aspect of the pet toy in accordance with the first aspect, the first deformable member is an elongated member having a top side and a bottom side.

In a fifth aspect of the pet toy in accordance with the fourth aspect, the first and second receiving openings are disposed adjacent to the top side of the first deformable member.

In a sixth aspect of the pet toy in accordance with the first aspect, the first deformable member includes a continuous channel that connects the first and second receiving openings.

In a seventh aspect of the pet toy in accordance with the sixth aspect, the continuous channel receives the second deformable member to store the second deformable member to the first deformable member.

In an eighth aspect of the pet toy in accordance with the seventh aspect, the continuous channel receives the second deformable member by interference fit.

In a ninth aspect of the pet toy in accordance with the fourth aspect, the first deformable member includes a continuous channel that connects the first and second receiving openings.

In a tenth aspect of the pet toy in accordance with the ninth aspect, the continuous channel extends from the first receiving opening, the second receiving opening and the bottom side of the first deformable member.

In an eleventh aspect of the pet toy in accordance with the ninth aspect, the continuous channel has a helical configuration extending along the first deformable member.

In a twelfth aspect of the pet toy in accordance with the ninth aspect, the continuous channel has a depth that is approximately equivalent to a radius of the second deformable member so that the second deformable member is fitted to the continuous channel by interference fit.

In a thirteenth aspect of the pet toy in accordance with the ninth aspect, the continuous channel has an arcuate cross-section.

In a fourteenth aspect of the pet toy in accordance with the first aspect, the second deformable member is movable with respect to the first deformable member between a tug position and a stowed position.

In a fifteenth aspect of the pet toy in accordance with the fourteenth aspect, the second deformable member forms a ring that is attached to the first deformable member when the second deformable member is in the tug position.

In a sixteenth aspect of the pet toy in accordance with the fourteenth aspect, the second deformable member wraps around the first deformable member when the second deformable member is in the stowed position.

Embodiments of the present disclosure combine a chew toy with a tug toy. Moreover, these embodiments are capable of saving space since the tug rope can be stowed on a portion of the toy. This configuration along with the embodiments of the present disclosure illustrate two toys formed from one integral structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
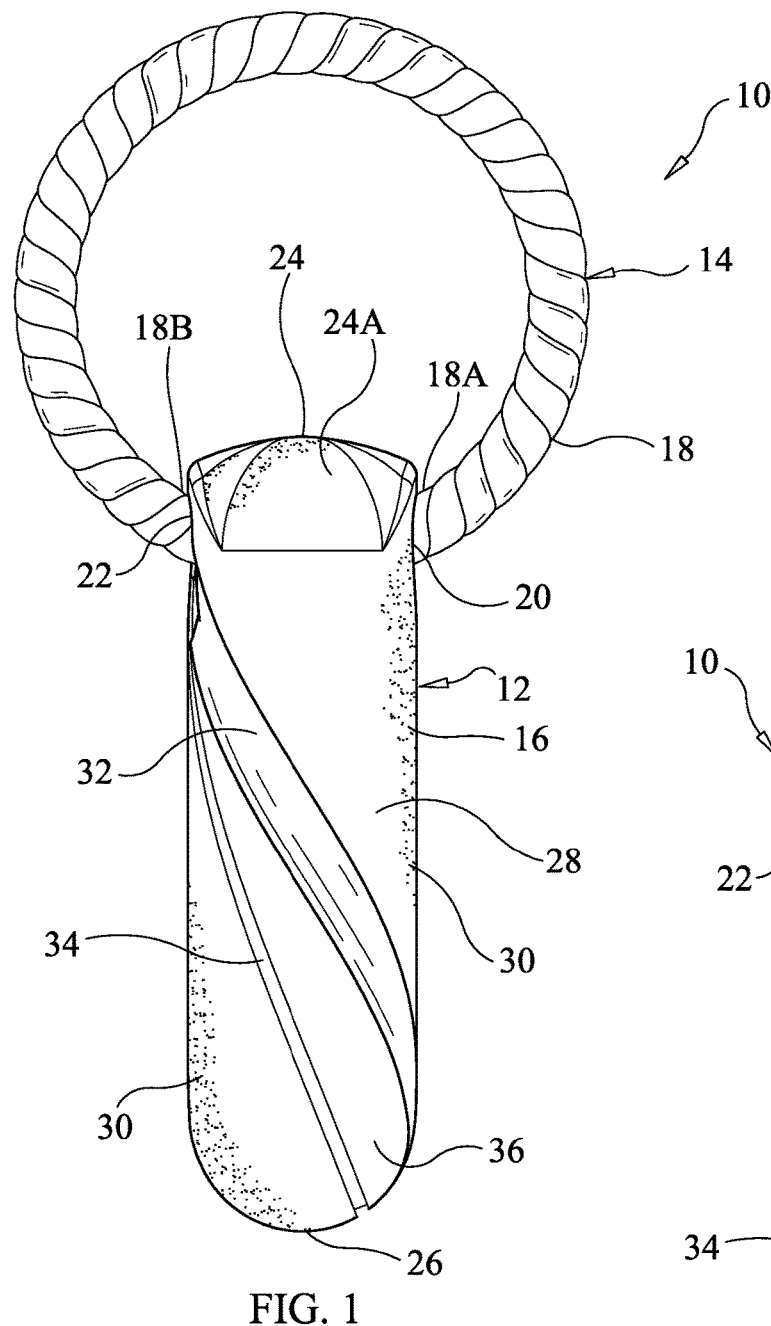
FIG. 1 is an elevational view of a front of a pet toy with a rope unstowed from a main body of the pet toy.
Figure 2:
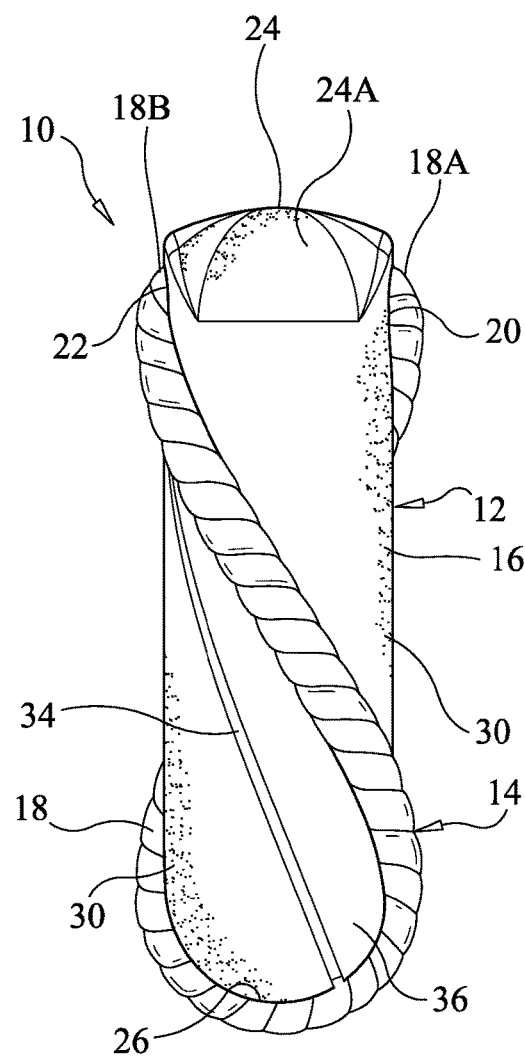
FIG. 2 is an elevational view of the front of the pet toy with the rope stowed to the main body.

Referring initially to FIGS. 1 and 2, a pet toy 10 is illustrated in accordance with an embodiment. The pet toy 10 comprises a first deformable member 12 and a second deformable member 14. In particular, the first deformable member 12 comprises a main body 16 of the pet toy 10. The second deformable member 14 is fixed to the main body 16 and is movable with respect to the main body 16, as will be discussed below. In the illustrated embodiment, the main body 16 is preferably made of a durable and resilient material that is also deformable and has elastic properties so that it retains its shape and overall structure during use. In the illustrated embodiment, the main body 16 is preferably made of vulcanized rubber. Alternatively, the main body 16 can be made of sturdy nylon and/or memory foam.

In the illustrated embodiment, the second deformable member 14 is a rope 18 that is attached to the main body 16. Therefore, in the illustrated embodiment, the second deformable member 14 is more deformable than the first deformable member 12. The rope 18 is preferably made of polypropylene that is durable but resilient. In the illustrated embodiment, the rope 18 serves as an additional chewing texture with respect to the main body 16. The differing textures between the rope 18 and the main body 16 help the pet maintain interest in the pet toy 10 during use. As best seen in FIGS. 1 to 5, the main body 16 has an oblong shape that incentivizes dogs to rock, roll, and flip the pet toy 10 around. Pets can use the rope 18 to maneuver and position the toy into different chewing positions.

The pet toy 10 of the illustrated embodiment having the main body 16 and the rope 18 is designed to be a bumper dog toy. The pet toy 10 is further designed to float and endure abrasion from the dog chewing on the pet toy 10. Therefore, the pet toy 10 is additionally designed to be resilient and deformable to so that the pet toy 10 can also serve as a chew toy. As shown, the rope 18 forms a ring that is attached to the main body 16 that allows the rope 18 to serve as a handle for playing tug of war with the pet.

In the illustrated embodiment, the rope 18 is movable with respect to the main body 16 between a tug position (FIG. 1) and a stowed position (FIG. 2). As shown in FIG. 1, the rope 18 forms a ring that is attached to the main body 16 when the rope 18 is in the tug position. That is, the rope 18 forms the ring that can serve as a handle of the pet toy 10. The pet can tug at the rope 18 or alternatively tug at the main body 16 during tug of war. The rope 18 wraps around the main body 16 when the rope 18 is in the stowed position, as seen in FIG. 2. The stowed position allows for space saving when the pet toy 10 is not in use.

Figure 3:
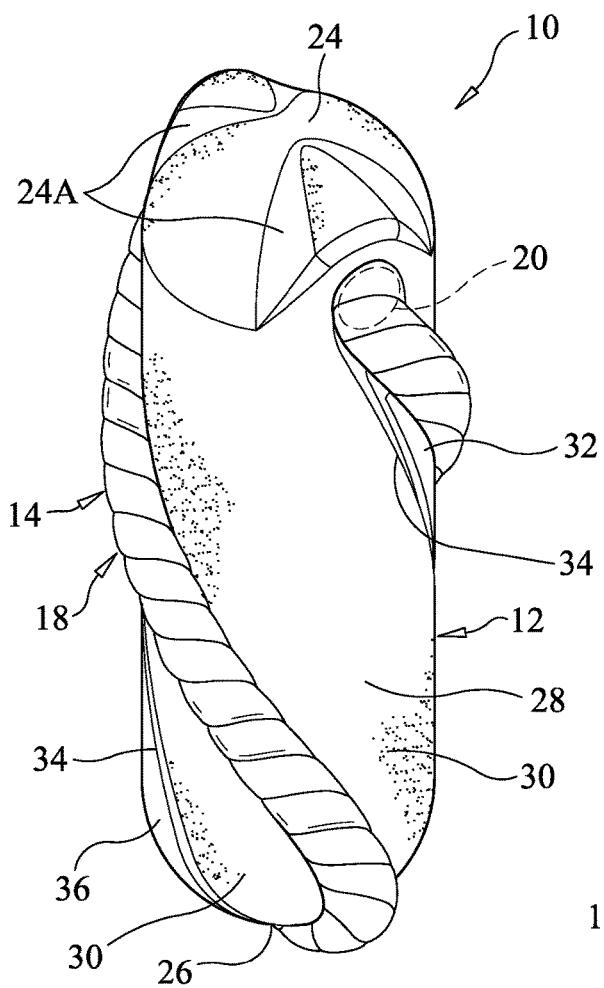
FIG. 3 is a top perspective view of the pet toy with the rope stowed to the main body.
Figure 4:
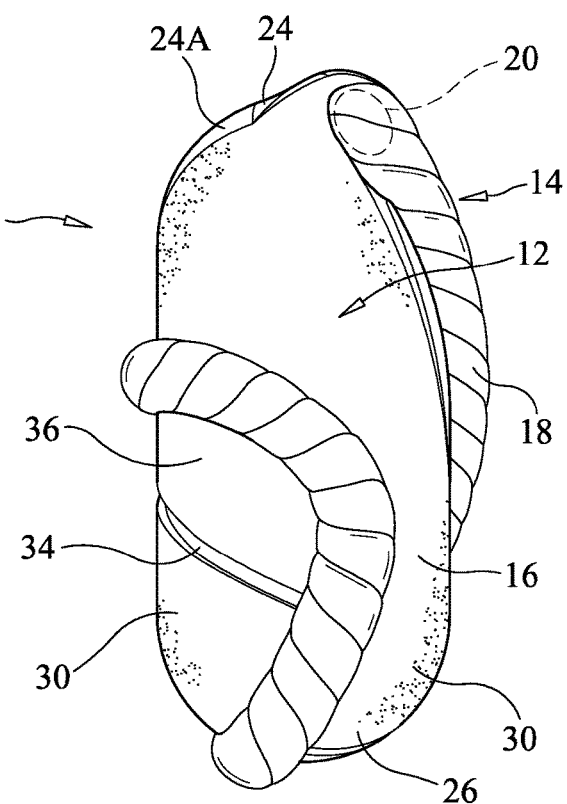
FIG. 4 is a bottom perspective view of the pet toy with the rope stowed to the main body.
Figures 5, 6:
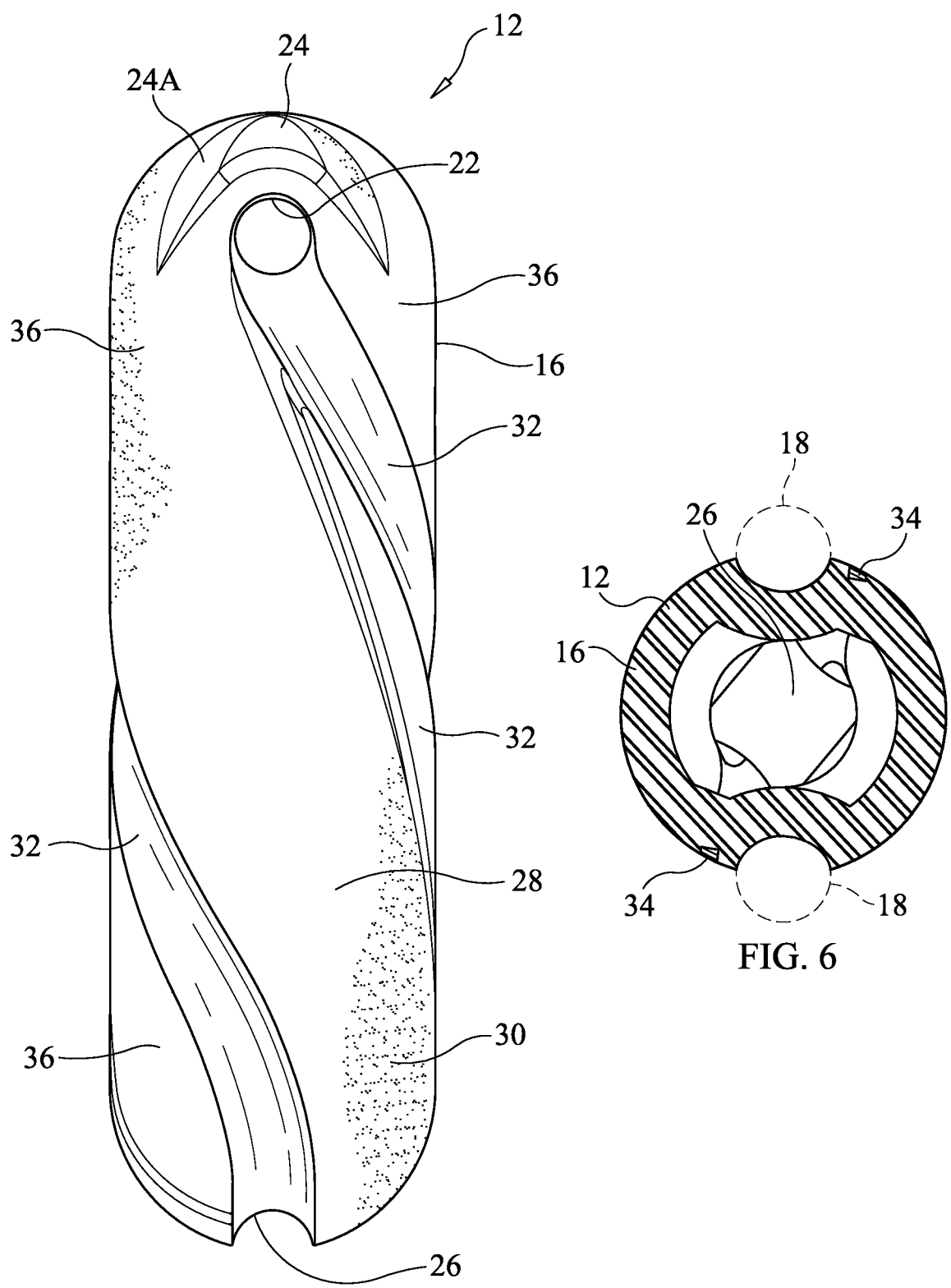
FIG. 5 is a side elevational view of the pet toy with the rope removed.
FIG. 6 is a cross-sectional view of the main body of the pet toy.
Figure 7:
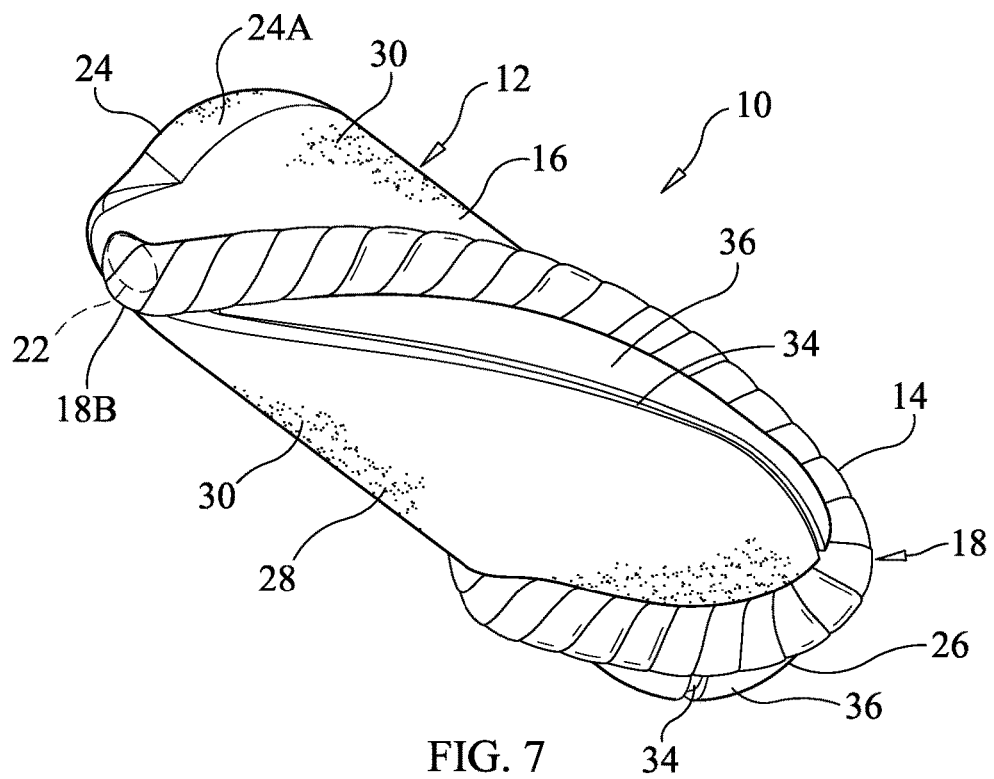
FIG. 7 is a side perspective view of the pet toy with the rope stowed to the main body.
Figure 8:
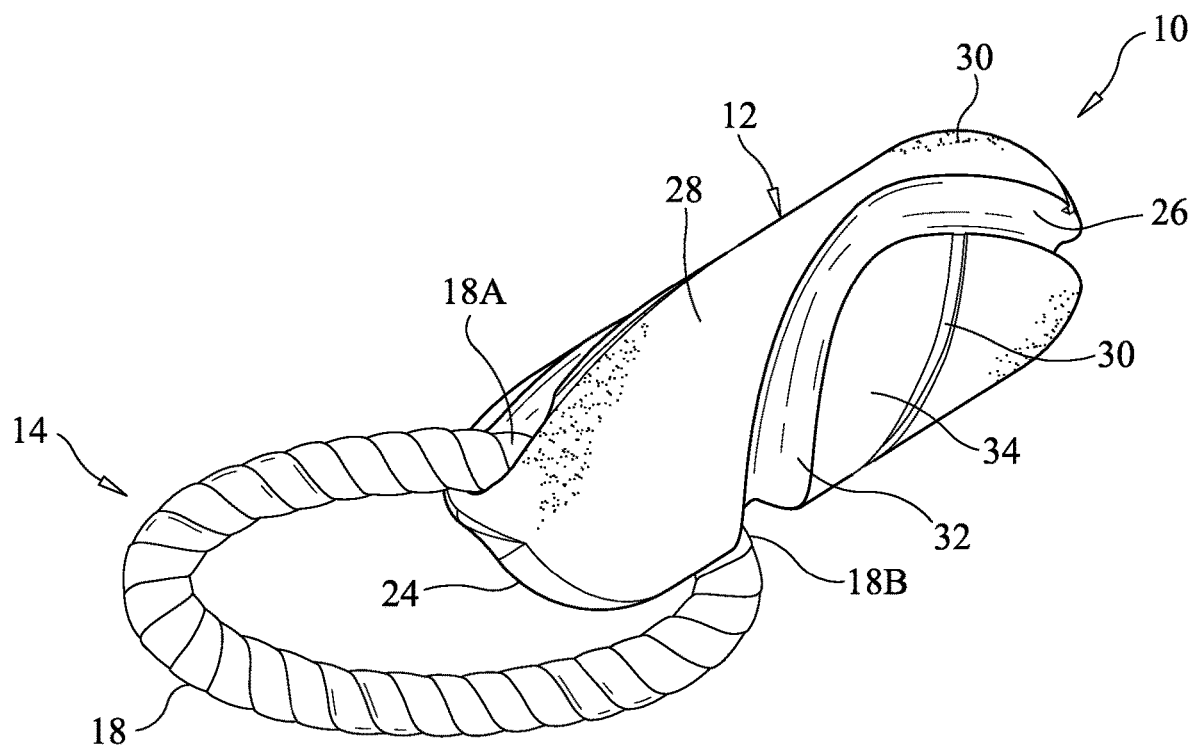
FIG. 8 is a side perspective view of the pet toy with the rope unstowed from the main body.
Figure 9:
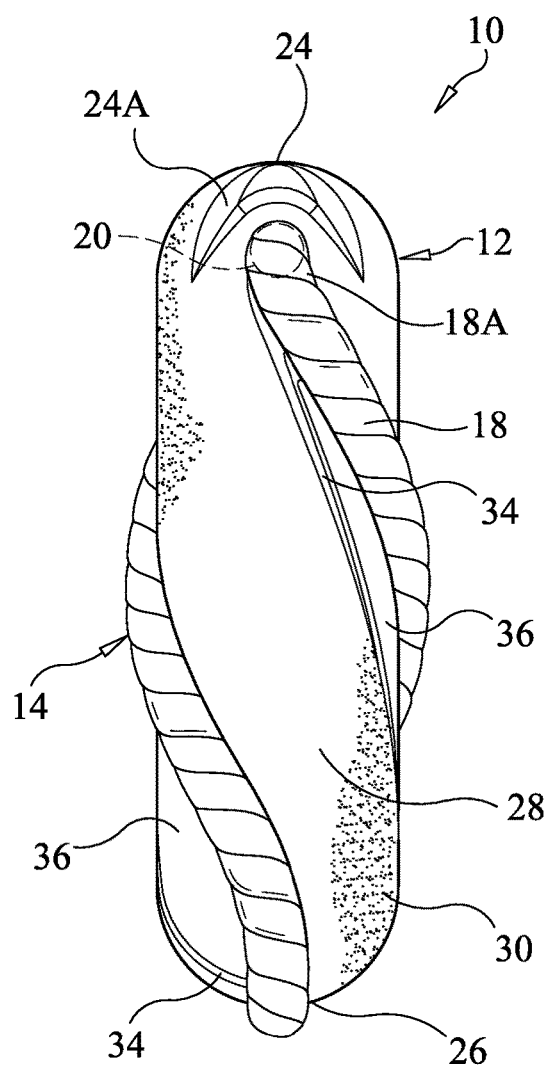
FIG. 9 is a side elevational view of the pet toy with the rope stowed to the main body.

As seen in FIGS. 3 to 5, the main body 16 has a first receiving opening 20 and a second receiving opening 22. The rope 18 has a first end 18A that is received in the first receiving opening 20. The rope 18 has a second end 18B that is received in the second receiving opening 22 of the main body 16. The first and second ends 18A and 18B are opposite ends of the rope 18. The first and second ends 18A and 18B of the rope 18 define a pair of joints for the rope 18 with respect to the main body 16.

The pet toy 10 further includes fasteners for securing the joints of the rope 18 to the main body 16. Preferably, the pet toy 10 includes nylon fasteners that secure the first and second ends 18A and 18B of the rope 18 where the interior of the first and second receiving openings 20 and 22 are over-molded to the first and second ends 18A and 18B of the rope 18. Therefore, the rope 18 is bonded to the main body 16 without need for sewing. The main body 16 and the rope 18 can also be bonded by "slit bonding" methods.

As shown, the main body 16 is preferably an elongated member having an oblong or elliptical shape. The main body 16 has a top side 24 (FIG. 3) and a bottom side 26 (FIG. 4). The main body 16 further includes a substantially cylindrical sidewall 28 that connects the top and bottom sides 24 and 26. As shown, the top side 24 tapers towards the cylindrical sidewall 28. The bottom side 26 is substantially rounded. It will be apparent to those skilled in the pet products field from this disclosure that the main body 16 can have a variety of shapes and/or dimensions as desired. Preferably, as best seen in FIGS. 1 and 2, the main body 16 has an abrasive surface 30 that is textured so to induce the pet to chew on the main body 16.

The first and second receiving openings 20 and 22 are disposed adjacent to the top side 24 of the main body 16. That is, in the illustrated embodiment, the first and second receiving openings 20 and 22 are preferably disposed closer to one of the top and bottom sides 24 and 26 of the main body 16 so that the rope 18 can extend beyond the main body 16 in the longitudinal direction. However, it will be apparent to those skilled in the pet products field from this disclosure that the first and second receiving openings 20 and 22 can be disposed adjacent to the bottom side 26 of the main body 16 so that the rope 18 extends longitudinally beyond the bottom side 26 of the main body 16.

While the main body 16 of the illustrated embodiment includes a pair of first and second receiving openings 20 and 22, it will also be apparent to those skilled in the pet products field from this disclosure that the main body 16 can include additional receiving openings for receiving additional ropes to the main body 16 as needed and/or desired. Therefore, the pet toy 10 can be further provided with an additional rope that is attached to the main body 16 at an opposite end of the main body 16 as the rope 18, or can be attached to the main body 16 adjacent to the rope 18.

Figure 10:
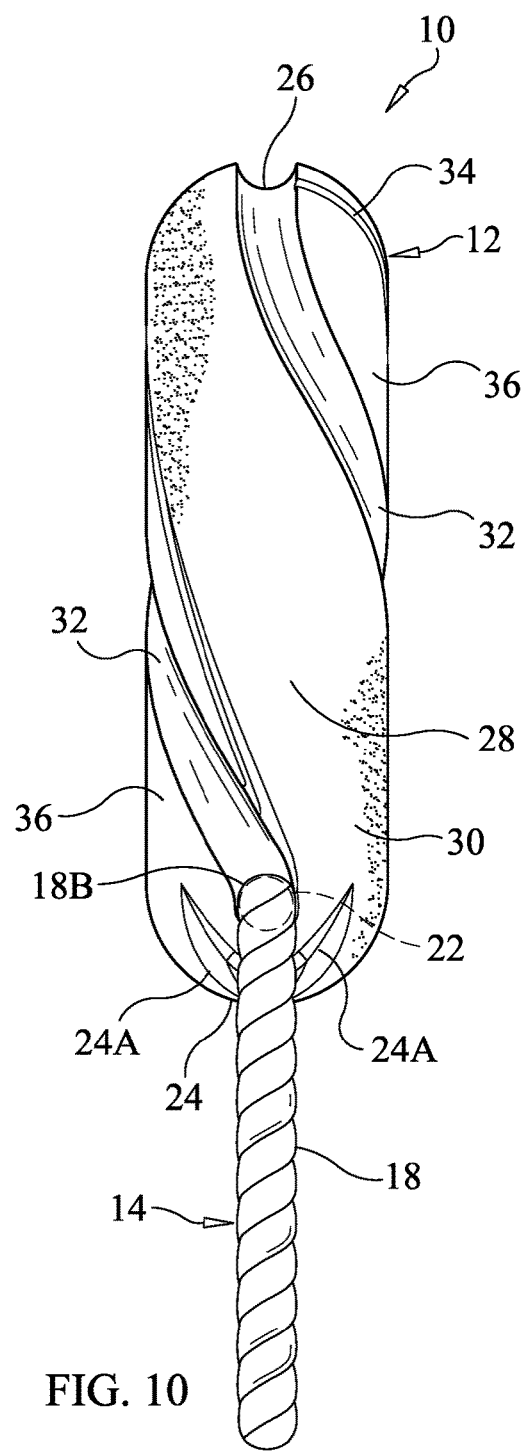
FIG. 10 a side elevational view of the pet toy with the rope unstowed from the main body.
Figure 11:
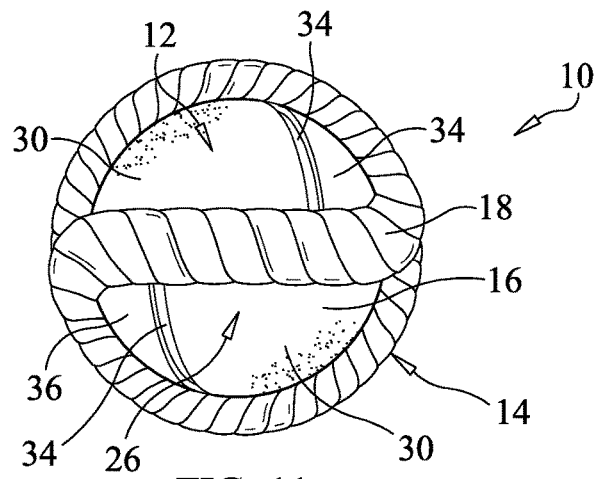
FIG. 11 is a bottom plan view of the pet toy with the rope stowed to the main body.
Figure 12:
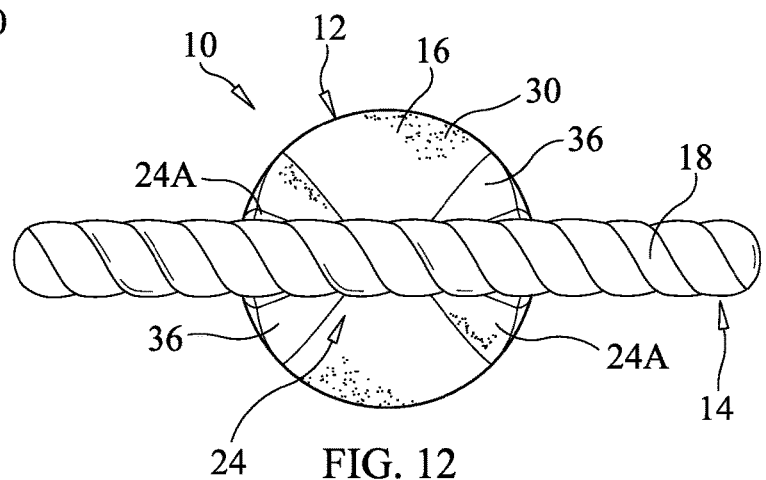
FIG. 12 is a top plan view of the pet toy with the rope unstowed from the main body.
Figure 13:
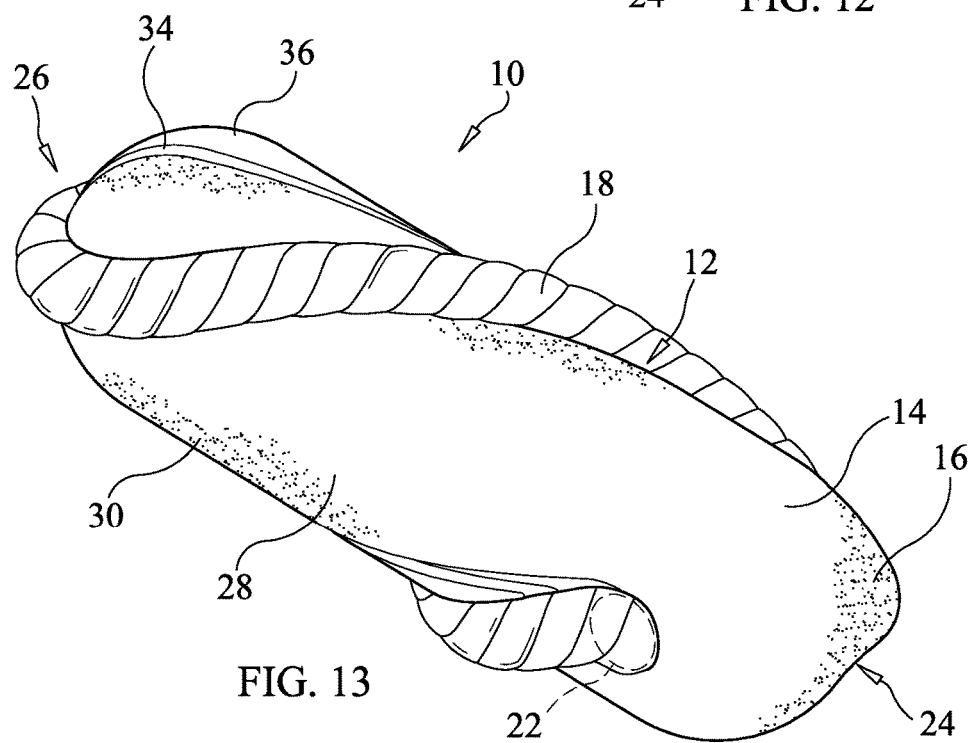
FIG. 13 is a top side elevational view of the pet toy with the rope stowed to the main body.

The main body 16 includes a continuous channel 32 that connects the first and second receiving openings 20 and 22. The continuous channel 32 receives the rope 18 to store the rope 18 to the first deformable member 12. The rope 18 is stowed in the continuous channel 32 in the stowed position. Therefore, the continuous channel 32 is an elongated indentation along a surface of the cylindrical sidewall 28 of the main body 16. The continuous channel 32 has an arcuate configuration when viewed in cross section (see for example, FIG. 10) in which the depth of the continuous channel 32 is approximately equal to or less than a radius of the rope 18. Such a depth of the continuous channel 32 enables the rope 18 to be securely held therein, while also enabling the user to be able to remove the rope 18 relatively easily. In other words, the depth of the continuous channel 32 is configured to prevent a pet from removing the rope during play, but shallow enough to enable a user to remove the rope 18 for use a tug. However, the continuous channel 32 can have any configuration and depth that is suitable for stowing of the rope 18.

Preferably, the continuous channel 32 receives the second deformable member 14 by interference fit (e.g., friction fit). That is, the continuous channel 32 has a length and a shape that substantially corresponds to an overall length and shape of the rope 18. In the illustrated embodiment, the rubber of the main body 16 is preferably molded to have the first and second receiving openings 20 and 22 and the continuous channel 32.

As shown, the continuous channel 32 extends about the main body 16 from the first receiving opening 20, the second receiving opening 22. In particular, the continuous channel 32 extends from the first receiving opening 20, the second receiving opening 22 and the bottom side 26 of the first deformable member 12. More preferably, the continuous channel 32 extends across the cylindrical sidewall 28 and the bottom side 26 of the main body 16 to connect the first and second receiving openings 20 and 22 forming a helical configuration. That is, the channel 32 wraps around the main body in a radial and longitudinal direction to form helical shape similar to a "candy cane" stripe. As best seen in FIGS. 2 to 4, the rope 18 wraps around the cylindrical sidewall 28 and the bottom side 26 of the main body 16 when the rope 18 is in the stowed position.

Preferably, as best seen in FIGS. 1 and 2, the continuous channel 32 has a surface that is smooth and without abrasions. That is, the surface of the cylindrical sidewall 28 is textured to contrast with the smooth surface of the continuous channel 32. Further, the pet toy 10 has a continuous groove 34 that is slightly offset of the channel along the main body 16. The groove 34 has a length and pattern that corresponds to the continuous channel 32. The groove 34 and the continuous channel 32 are separated by a portion 32 of the main body 16 that is smooth and without abrasions. The portion 32 provides a contrasting texture to the majority of the main body 16 (the abrasive surface 30) that is textured. Therefore, the main body 16 of the embodiment includes textured (e.g., abrasive) portions (e.g., the abrasive surface 30) and non-textured (e.g., non-abrasive or smooth) portions (e.g., the smooth portion 32).

Embodiments described herein combine a chew toy with a tug toy. These embodiments are capable of saving space since the tug rope can be stowed on a portion of the toy. This configuration along with the embodiments of the present disclosure illustrate two toys formed from one integral structure.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a pet toy. Accordingly, these terms, as utilized to describe the present invention should be interpreted relative to a pet toy.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pet toy comprising:
   a first deformable member having a first receiving opening and a second receiving opening, and
   a second deformable member having a first end that is received in the first receiving opening, and a second end that is received in the second receiving opening of the first deformable member, the second deformable member being more deformable than the first deformable member, the second deformable member being movable with respect to the first deformable member between a tug position and a stowed position.

2. The pet toy according to claim 1, wherein the first deformable member is made of rubber.

3. The pet toy according to claim 2, wherein the second deformable member is a rope.

4. The pet toy according to claim 1, wherein the first deformable member is an elongated member having a top side and a bottom side.

5. The pet toy according to claim 4, wherein the first and second receiving openings are disposed adjacent to the top side of the first deformable member.

6. The pet toy according to claim 1, wherein the first deformable member includes a continuous channel that connects the first and second receiving openings.

7. The pet toy according to claim 6, wherein the continuous channel receives the second deformable member to store the second deformable member to the first deformable member.

8. The pet toy according to claim 7, wherein the continuous channel receives the second deformable member by interference fit.

9. The pet toy according to claim 4, wherein the first deformable member includes a continuous channel that connects the first and second receiving openings.

10. The pet toy according to claim 9, wherein the continuous channel extends from the first receiving opening, the second receiving opening and the bottom side of the first deformable member.

11. The pet toy according to claim 9, wherein the continuous channel has a helical configuration extending along the first deformable member.

12. The pet toy according to claim 9, wherein the continuous channel has a depth that is approximately equivalent to a radius of the second deformable member so that the second deformable member is fitted to the continuous channel by interference fit.

13. The pet toy according to claim 9, wherein the continuous channel has an arcuate cross-section.

14. The pet toy according to claim 1, wherein the second deformable member forms a ring that is attached to the first deformable member when the second deformable member is in the tug position.

15. The pet toy according to claim 14, wherein the second deformable member wraps around the first deformable member when the second deformable member is in the stowed position.

* * * * *